INVENTORS
HOWARD E. TOMPKINS
WILLIAM E. BRADLEY
BY
Ostrolenk and Faber
ATTORNEYS Patented June 13, 1950 2,511,606

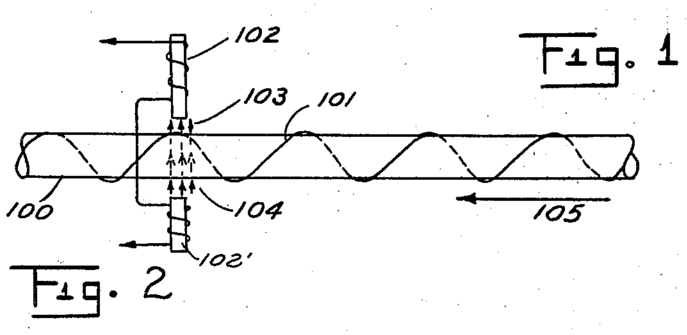
Fig. 1
Fig. 2
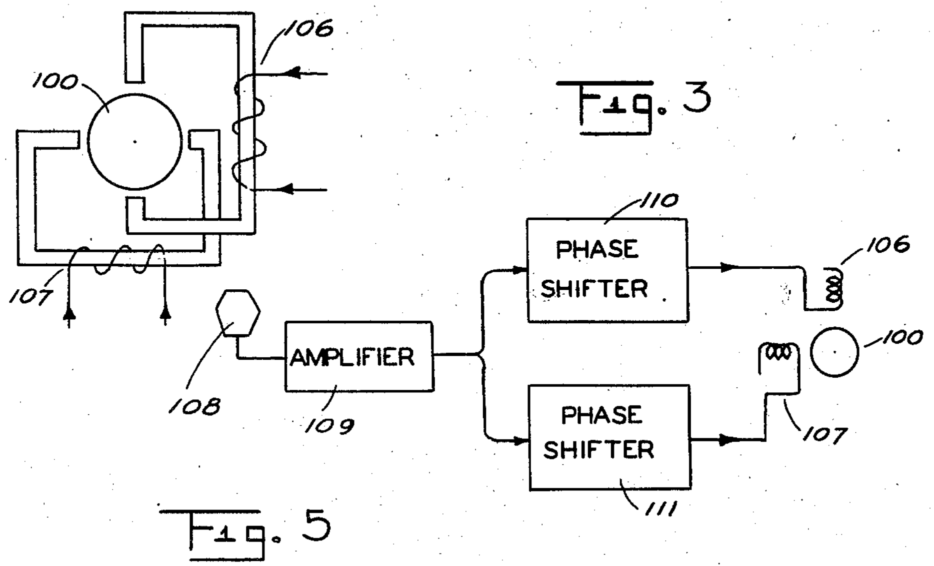
Fig. 2, Fig. 3
Fig. 5
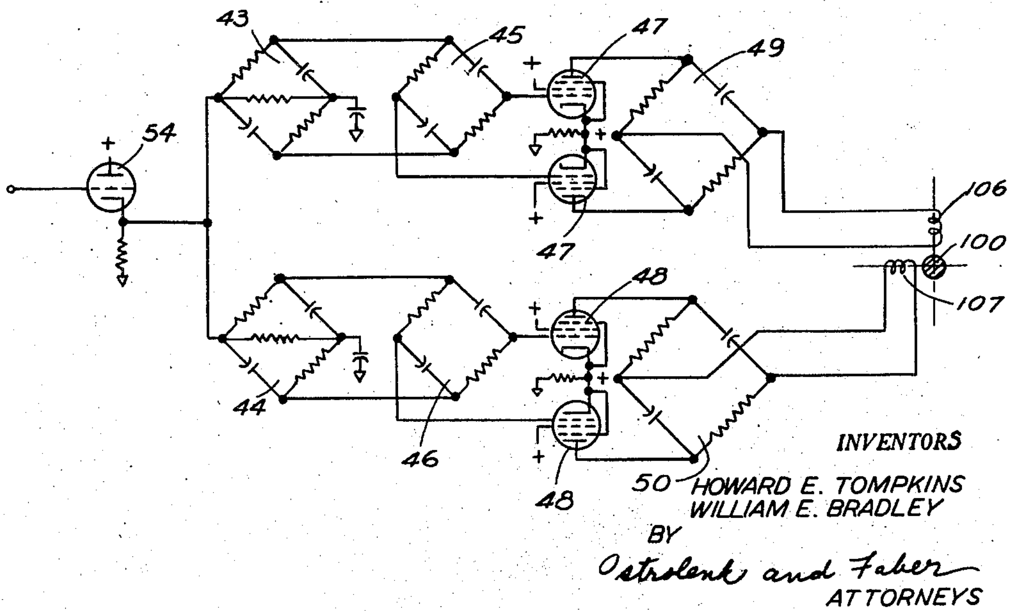
INVENTORS
HOWARD E. TOMPKINS
WILLIAM E. BRADLEY
BY
Ostrolenk and Faber
ATTORNEYS June 13, 1950 H. E. TOMPKINS ET AL 2,511,606
METHOD AND APPARATUS FOR PRODUCING A HELICAL
MAGNETIC SOUND TRACK ON A WIRE RECORD
Filed Oct. 9, 1945 2 Sheets-Sheet 2

UNITED STATES PATENT OFFICE 2,511,606

METHOD AND APPARATUS FOR PRODUCING A HELICAL MAGNETIC SOUND TRACK ON A WIRE RECORD

Howard E. Tompkins, Media, and William E. Bradley, Swarthmore, Pa., assignors, by mesne assignments, to Philco Corporation, Philadelphia, Pa., a corporation of Pennsylvania Application October 9, 1945, Serial No. 621,292

15 Claims. (Cl. 179—100.2)

This invention relates to a magnetic wire recorder, more specifically, it relates to a system for the recording of intelligence upon a magnetic wire in such a manner that the orientation of the wire is unimportant in the reproducing of such intelligence from the record on the wire.

In recording intelligence upon a round wire by the transverse method of magnetization, a difficulty is encountered in the reproduction of the sound or other intelligence from the record on the wire because of the circular cross-section of the wire. This circular cross-section makes it possible for the wire to twist upon its longitudinal axis. Consequently, it is possible during reproduction for the wire to twist to such an extent that the magnetization of the wire is at right angles to the pick-up coil of the reproducer. Under these circumstances, no signal is obtained from the wire.

Various arrangements have been suggested for overcoming such a difficulty. One such arrangement involves the use of automatic volume control in the amplifier, but this automatic volume control ceases to function when the wire has rotated a full 90° from the pick-up coil.

Another method which has been suggested for overcoming this difficulty employs an automatic follow-up system whereby the pick-up coils are caused to rotate around the longitudinal axis of the wire in synchronism with the twisting of the wire. Such a mechanism, while accomplishing the result is unduly and unnecessarily subject to high maintenance cost and easy possible failure.

In accordance with our invention, it is possible to record transversely upon the round magnetic wire in such a manner that twisting of the wire is unimportant as far as the reproduction of the signals is concerned.

In general, we effect transverse recording in a helical manner upon the round wire. That is, as a single frequency is impressed upon the recorder, the magnetization in the wire is caused to progress helically along the wire instead of being in one direction in the cross-section only. When a record which has been recorded helically is reproduced by an ordinary type of reproducer for transverse recording, the angular orientation of the wire is immaterial except as it produces a possible slight change in phase with respect to the recorded signal. However, it is well known that slight changes in phase angle are unimportant as far as the ear is concerned. Consequently for the recording of sound, no distortion is produced by helical recording.

When several frequencies are combined in the signal to be recorded, each frequency is caused to record in a helical manner independently of the other frequencies. For each frequency, the pitch of the helix along the wire is such that in one period of the frequency being recorded, the magnetization has rotated once around the wire. Consequently, for each frequency being recorded, the pitch on the wire, that is the distance along the wire for one complete revolution of the wire magnetization is different: for low frequencies, the pitch is long, for high frequencies the pitch is short.

When a recording made in this manner is reproduced by an ordinary type of transverse reproducer, the pick-up head has generated in it voltages corresponding to the sum of the magnetizations of each frequency involved in the recording on the wire. That is, the wave shape of the voltage in the pick-up coil will be that which would be obtained by the summation of wave shapes of the corresponding frequencies which are recorded.

Since each of these recorded frequencies has its own pitch along the magnetic wire, the phase relationship of the various frequencies will differ as the wire rotates in the pick-up head—that is, as the wire rotates about its longitudinal axis in accordance with whatever twist may be set up by the reproducing machine.

However, in view of the fact that the ear is not sensitive to small changes in phase angle between the various frequency components of a signal, this shift in phase angle as the wire twists in the recorder or reproducer does not cause any serious difficulty in the understanding of the reproduced signal. In fact, the ear is insensitive to this action.

As a result of our invention then, it becomes possible to use round wires for transverse magnetic recording and to use a very simple reproducing mechanism for reproducing the record into sound.

Accordingly, an object of our invention is to provide a means for recording transversely upon round magnetic wire in such a manner as to avoid difficulties in reproduction due to the twisting of the wire.

Another object of our invention is to provide means for using transverse recording upon round magnetic wire.

These objects and other objects of our invention will become evident upon study of the following drawings, in which:

Figure 1 represents a helical type of record and its association to the pick-up coil in the reproducer;

Figure 2 represents the principle of the recording head;

Figure 3 shows in block diagram the principle of the complete recorder;

Figure 5 shows detailed circuit of the block diagram of Figure 3.

Figure 4:
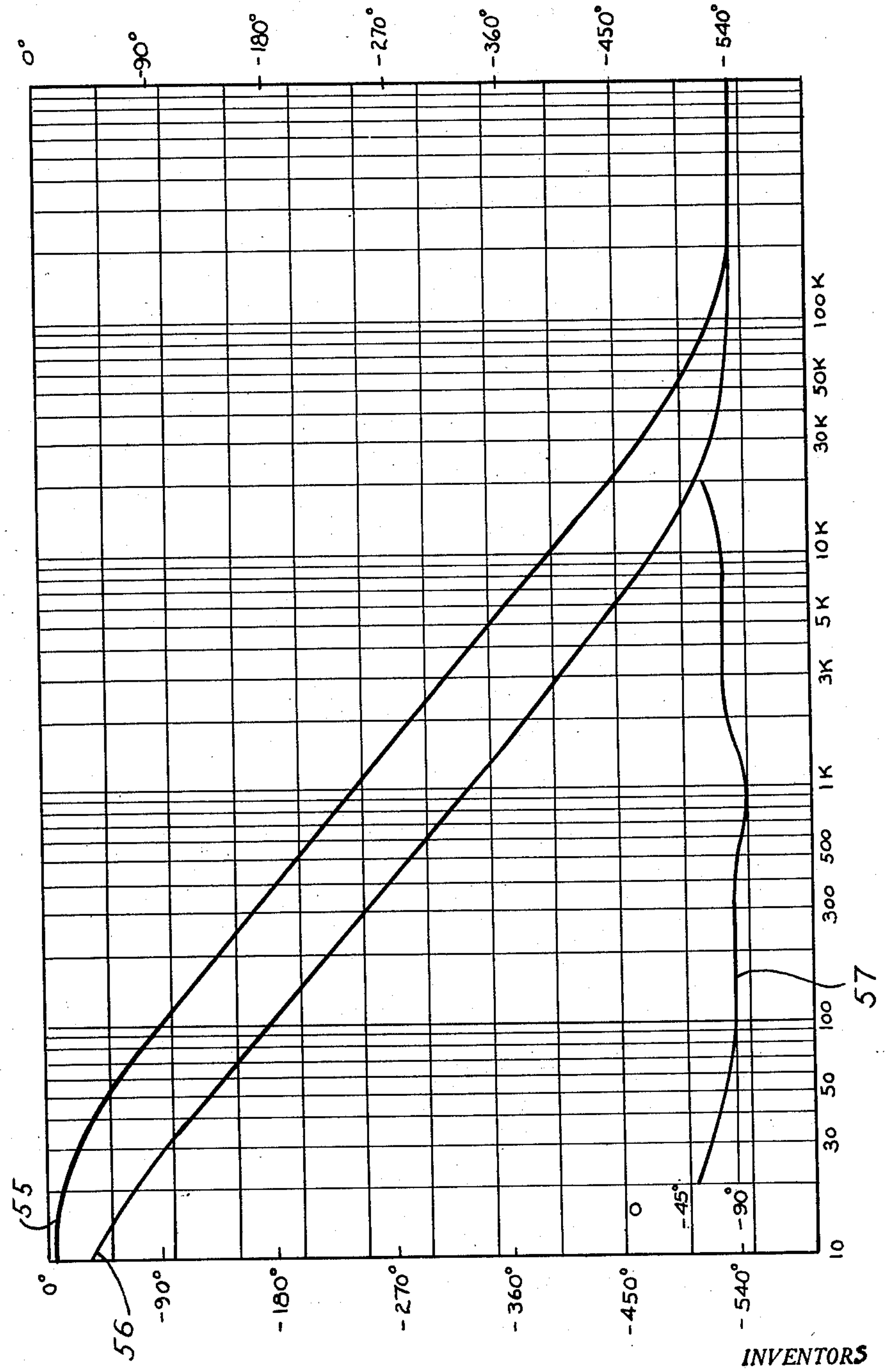
Figure 4 shows the characteristics of the phase shifting network in Figure 3.

Referring to Figure 1, the round magnetic wire 100 is shown as broken at its two ends to indicate that the wire is considerably longer than is shown in the figure. The helical line 101 along and around this wire 100 represents the location of the magnetization which would result from a sinusoidal signal being impressed upon the wire according to our invention. This line 101 represents the location of the maximum magnetization and it is to be understood that the magnetization is transverse in the wire.

For example, immediately under the pick-up coil 102, the flux lines 103 and 104 are shown as entering at the bottom of the wire and leaving the wire at the top, having passed through the wire. These flux lines are the result of magnetization in the wire existing in the direction of the flux line within the wire.

Thus, where flux lines 103 leave the wire, there exists upon the surface of the wire a north magnetic pole and where flux lines 104 enter the wire, there exists upon the wire a south magnetic pole. The location of the north magnetic pole, in accordance with my method of recording, rotates spirally or helically along the wire in accordance with the line 101 drawn upon the surface of this wire. The corresponding location of the south pole is not shown on the diagram as this is understood to be always diametrically opposite to the location of the north pole as the north pole spirals along the wire.

As the wire 100 is moved through the reproducer in accordance with the arrow of direction 105, the voltage magnetically induced in coil 102 varies in accordance with the rate of change of magnetic flux through the core of coil 102. Thus as the wire passes the position shown in Figure 1, there no voltage is being generated in coil 102 since the flux through coil 102 is going through a maximum and consequently is not changing at all. As wire 100 is passed under the coil 102, a sinusoidal voltage is induced in coil 102 with a frequency proportional to the velocity of the wire and inversely proportional to the length along the wire required for the direction of magnetization to be rotated completely through 360° around the wire—that is through one revolution.

The most important feature of this method of recording is that the same result is obtained no matter what the angular orientation of the wire 100 is. That is, the wire can be twisted to any amount and yet the frequency received by the pick-up coil 102 will be the same. In considering this, it is of course necessary to conceive of a twist in the wire 100 which has a pitch considerably longer than the pitch of any recorded signal since otherwise, a change in frequency of the recorded signal would occur. However, in practice, the twists which occur in the wire 100 do have that property—that is, they are relatively gradual twists.

In order to record a signal such as is shown in Figure 1 upon a wire, a structure symbolized by Figure 2 is used. This structure is very similar to the type of structure used for a two-phase voltage and is shown in Figure 2 in its most elemental form. Two magnetizing coils and associated magnetic yokes 106 and 107 are employed.

The signals feeding these two coils are arranged to be 90° out of phase with each other. As is well known in motor theory, such a signal applied to such a magnetic structure will cause a revolving magnetic flux vector in the wire 100. In ordinary two-phase motors, this revolving magnetic field is the agency which causes the motor to rotate.

In this system of magnetic recording however, this rotating magnetic flux vector magnetizes the wire 100 in the helical method since as the magnetic flux vector is rotating, the wire is moving through the recording head at the same time. The combination of the motion of the wire past the recording head and the rotation of the magnetic flux causes the helical magnetization shown in Figure 1.

When more than one frequency is involved, as it usually is in the reproduction of any type of sound other than a pure note, the signals impressed upon coils 106 and 107 are made up of as many frequency waves as can be resolved from the complex sound wave.

In order for this magnetization to produce helical recording for each frequency component, it is necessary that the signals impressed upon coils 106 and 107 in Figure 2 partake of the fixed 90° phase shift between several frequency components and must achieve this fixed phase relation over a wide range of frequencies. For sound recording, it must accomplish this purpose over a substantial portion of the audio-frequency band.

If such a 90° angle is maintained over the operating frequency range, the signal recorded upon the wire 100 (Figure 2) will consist of a series of helical signals, each frequency of which will cause a rotation or helical path of magnetization upon the wire 100 independent of each other frequency. When the record is reproduced, as is shown in Figure 1, the pick-up coil 102 will then be energized by each of the individual frequencies separately and signals of these frequencies will be combined in the output system. Phase relationships between the frequency components will depend upon the angular position of the wire. It has been well established, however, that the ear is insensitive to moderate phase variation, and consequently the randomness of the phase in this circumstance does not constitute any difficulty in the interpretation of the output sound.

In order to achieve the 90° phase shift of the signal, as is required for Figure 2, the circuit as shown in block diagram form in Figure 3 is employed. Voice or other signals enter the microphone 108. These signals are amplified by the amplifier 109 to a sufficient level to operate the recorder. These signals are split into two channels—one channel going to phase shifter 110 and another channel going to phase shifter 111. Signals from phase shifter 110 are sent to magnetizing coil 106 and signals from phase shifter 111 are sent to magnetizing coil 107. The special property of the phase shifters 110 and 111 is such that over the audio-frequency range, the difference in phase shift between these two phase shifting networks is 90°. Thus, although phase shifter 110 shifts the phase of the signal from amplifier 109 for different amounts for each frequency involved, for any frequency within the audio-range, the phase shift occurring in network 111 is 90° more (or less) than the phase shift occurring in phase shifter 110. Consequently, for any frequency within the audio range, the signals applied to the two coils 106 and 107 are 90° out of phase with respect to each other.

In a modfication of our invention, we use a plurality of phase shifters, and a plurality of magnetic circuits so arranged that the physical orientation of the magnetic circuits is correlated with the phase shifts in the phase shifters. For example, three magnetic circuits arranged spatially at 120° intervals and three phase shifters designed for 120° phase angle differences provide a rotating magnetic flux vector in the same manner that the stator of a three-phase induction motor provides a rotating magnetic flux vector. Moreover, in one form of our invention, the magnetic circuits are constructed together as a single unit in a manner similar to that customarily employed in the manufacture of induction motors.

Figure 4 shows the phase shift curve obtained in one circuit which has been used for the block diagram of Figure 3. Phase shifter 110 has a phase shift in accordance with curve 55 in Figure 4. The lower channel, that is phase shifter 111, has a phase shift in accordance with curve 56 in Figure 4. Consequently the phase angle difference between these two curves is given by curve 57. Inspection of this curve indicates that from a frequency of about 45 cycles per second to 12,000 cycles per second, the phase angle does not vary more than 10° from the nominal value of 90°, and that for most of the range, the phase angle is considerably closer to 90° than this tolerance of 10°. Such a tolerance is sufficiently good for helical recording since this is a barely audible variation in the amplitude of the recorded signal.

In Figure 5 there is shown a detailed circuit diagram of the network used to obtain the curves of Figure 3. In the upper channel, two bridges 43 and 45 are placed in tandem. In accordance with the invention of Tompkins, described in copending application, Serial No. 613,457, filed August 30, 1945, bridge 43 is a low impedance bridge and bridge 45 is a high impedance bridge in accordance with the principles set forth in connection with the above-mentioned application. The output of bridge 45 is sent into a differential amplifier 47, which is loaded with low impedance bridge 49. This bridge 49 is fed from a high impedance source and feeds into a low impedance circuit following the principles set down for a bridge of this type in the above-mentioned patent application. This bridge 49 feeds into the recording coil 106 which records on the wire 100.

The impedance of coil 106 should, at all frequencies in the audio-spectrum, be low compared to the impedance looking back into the output of bridge 49 in order to meet the requirements of this bridge.

The lower channel is composed of a similar chain of elements: two bridges 44 and 46 followed by a differential amplifier 48, followed by another bridge 50 and feeding it to recording coil 107. In this current arrangement, both channels are fed from a common source which in order to provide a low impedance source is a cathode follower circuit 54, which is itself fed by the audio signal to be recorded.

The constants of these two bridge circuits are so chosen to give the curves shown in Figure 4 with the result that the signals applied to the two magnetizing coils 106 and 107 are substantially 90° out of phase with each other over the whole audio-spectrum.

The result is helical recording which makes it possible to reproduce the recording in any ordinary type of reproducer for use with transverse recording.

Our invention, which we have described above, relates to a particular embodiment of our method of helical recording on round magnetic wire. It is, of course, possible to accomplish this helical recording by various types of specific networks. Consequently, it becomes our desire to describe our invention in terms of the following claims.

We claim:

1. In a system for recording sound on a magnetic wire of circular cross-section, a pair of recording structures, a magnetic circuit and a magnetizing winding for carrying magnetizing current individual to each of said pair of recording structures, said recording structures being oriented with respect to said wire to produce magnetic fluxes in mutually perpendicular directions at the same location, and means including network units connected to each of said windings for producing signals in each of said windings one of which is substantially in quadrature with respect to the other.

2. In a system for recording sound on a magnetic wire of circular cross section, a pair of recording structures, a magnetic circuit and a magnetizing winding for carrying magnetizing current individual to each of said pair of recording structures, said recording structures being oriented to produce magnetic fluxes in mutually perpendicular directions at the same location with respect to said wire, and means including network units connected to each of said windings for producing signals in each of said windings one of which is substantially in quadrature with respect to the other over a band of frequencies.

3. In a system for recording sound, a pair of magnetic circuits, means for generating two signals from a source of signalling one of said signals being phase displaced with respect to the other, and means for energizing the first of said magnetic circuits with one of said generated signals and the second of said magnetic circuits with the other of said generated signals.

4. In a system for recording sound, a pair of magnetic circuits, means for generating two signals from a source of signalling one of said signals being phase displaced with respect to the other, and means for energizing the first of said magnetic circuits with one of said generated signals and the second of said magnetic circuits with the other of said generated signals, and means for magnetizing a magnetic wire in accordance with said generated signals.

5. In a system for recording sound, a plurality of magnetic circuits, a source of signalling means comprising a plurality of phase shifting networks having phase shifting characteristics for generating a plurality of signals from said source of signalling one of said plurality of signals being substantially in quadrature with respect to another of said plurality of signals and means for energizing each of said magnetic units with one of said plurality of generated signals individual to each magnetic unit.

6. In a device for recording sound on magnetic wire, a wire of magnetizable material having a circular cross section, means for simultaneously magnetizing said wire in two mutually perpendicular transverse directions in accordance with two magnetizing signals derived from an input signal, one of said magnetizing signals differing in phase from the other of said magnetizing signals by substantially 90° over a band of frequencies.

7. In a system for recording sound on a magnetic wire of circular cross-section, a pair of recording structures each comprising a magnetic circuit and a magnetizing winding for carrying magnetizing current, said recording structures being oriented to produce magnetic fluxes in mutually perpendicular directions at the same location, two phase-shifting networks each having input and output terminals, said input terminals being connected in parallel to form a common input connection, the output terminals of one of said phase shifting networks being connected to one of said magnetizing windings, the output terminals of the other of said phase shifting circuits being connected to the other of said magnetizing windings, and said phase shifting networks having phase shifts which differ by substantially 90° over a band of frequencies.

8. A magnetic wire record of circular cross section having signals of a series of frequencies received thereon in a series of helical paths around the wire, each of said recorded frequencies having a pitch individual thereto and being along the longitudinal axis.

9. The method of recording signals of a series of frequencies on a magnetic wire of circular cross-section which comprises causing the magnetization for each frequency to progress helically independently of all the other frequencies along the wire as the signal frequencies are impressed on the wire.

10. The method of recording signals on a magnetic wire of circular cross-section which comprises recording a signal of a plurality of frequencies in a helical path around the wire as the wire progresses longitudinally, the pitch of the helix along the wire being such that for each frequency recorded, the magnetization rotates completely around the wire in one period of that frequency.

11. A magnetic wire record of circular cross-section having signals of a plurality of frequencies recorded thereon on a corresponding plurality of helical paths, the pitch of each of the helices along the wire being such that in one period of any one of the frequency being recorded, the magnetization therefor has rotated once around the wire.

12. A magnetic wire record of circular cross-section having signals comprised of a plurality of frequencies recorded therein, each frequency being recorded in a helical manner independently of the other frequencies, and for each frequency the pitch of the helix along the wire being such that in one period of the frequency being recorded, the magnetization has rotated once around the wire.

13. The method of recording signals in a magnetic wire which comprises producing two independent signals from a single source at substantially 90° phase displaced from each other and magnetizing a wire simultaneously by fluxes generated by said signals.

14. The method of recording signals in a magnetic wire of circular cross-section which comprises producing signals substantially 90° phase displaced from each other generating magnetic fluxes substantially 90° space displaced from each other and magnetizing said wire while said wire is moving longitudinally past said fluxes to produce a helical recording on said wire.

15. The method of recording signals in a magnetic wire of circular cross-section which comprises producing signals phase displaced from each other generating magnetic fluxes space displaced from each other by angles substantially equal to the phase displacement of the signals and magnetizing said wire while said wire is moving longitudinally past said fluxes to produce a helical recording on said wire.

HOWARD E. TOMPKINS.
WILLIAM E. BRADLEY.

REFERENCES CITED

The following references are of record in the file of this patent:

UNITED STATES PATENTS

| Number | Name | Date |
|---|---|---|
| 1,865,200 | Mathias | June 28, 1932 |
| 1,949,409 | Cohen | Mar. 6. 1934 |
| 2,245,286 | Marzocchi | June 16, 1941 |
| 2,251,300 | Star | Aug. 5, 1941 |
| 2,272,821 | Roys | Feb. 10, 1942 |
| 2,334,510 | Roberts | Nov. 16, 1943 |
| 2,425,213 | Sunstein | Aug. 7, 1947 |
| 2,458,315 | Sunstein | Jan. 4, 1949 |

FOREIGN PATENTS

| Number | Country | Date |
|---|---|---|
| 651,990 | France | Mar. 1, 1929 |
| 594,991 | Germany | Mar. 24, 1934 |